3,060,095
METHOD OF ADMINISTERING VITAMIN $B_{12}$
Morris E. Stolar, Mount Freedom, N.J., assignor to Warner-Lambert Pharmaceutical Company, Morris Plains, N.J., a corporation of Delaware
No Drawing. Filed Mar. 21, 1961, Ser. No. 97,150
3 Claims. (Cl. 167—81)

This application relates to a composition comprising a vitamin $B_{12}$ material which in the form of said composition is more readily absorbed in the body.

The use of vitamin $B_{12}$ materials such as cyanocobalamin and hydroxycobalamin is well accepted medically in the treatment of pernicious anemia and other macrocytic anemias. In addition, vitamin $B_{12}$ materials have been shown to be essential for the maintenance of good health. The necessity for receiving an adequate supply of this material is no longer questioned although the daily requirements of this vitamin have not been fully established. One of the more recent findings of interest in geriatrics is that a mild state of vitamin $B_{12}$ deficiency frequently exists among the aged. A difficulty experienced in the administration of vitamin $B_{12}$ materials to overcome such deficiencies is not only the notoriously poor absorption of this vitamin but also the uncertain or variable manner in which absorption takes place.

Although absorption is improved by the concurrent administration of intrinsic factor this is generally recommended only where pernicious anemia is involved.

An object of this invention is the provision of a composition of a vitamin $B_{12}$ material by means of which enhanced absorption of said $B_{12}$ material may be obtained.

Other objects of this invention will appear form the following detailed description.

The term "vitamin $B_{12}$ material" as employed herein is to be understood as meaning not only cyanocobalamin but other cobalamin materials including hydroxycobalamin, anhydrous hydroxycobalamin, nitrocobalamin and chlorocobalamin, as well as cobalamin, dicyanocobalamin, thiocyanocobalamin, sulfatocobalamin, sulfitocobalamin, and the hydrogen sulfide addition product of cyanocobalamin.

It has now been found that the absorption of vitamin $B_{12}$ materials in humans may be greatly enhanced if said vitamin $B_{12}$ materials are combined with or adsorbed on to finely-divided magnesium trisilicate, e.g. up to about 100 microns particle size, and the magnesium trisilicate composition or adsorbate thus obtained is orally administered to humans in a solid dosage form such as tablets, capsules and powders, or in a liquid dosage form such as a suspension, etc. The amount of the vitamin $B_{12}$ material per gram of magnesium trisilicate may be varied widely depending upon the desired size of the dosage form and the amount of said vitamin $B_{12}$ material to be administered. Conveniently, the magnesium trisilicate adsorbates may contain from about 5 to about 50 micrograms of vitamin $B_{12}$ material per unit which readily permits the daily administration of an amount of vitamin $B_{12}$ material within this range. Normal adult daily requirements are considered to be at the lower end of this range whereas therapeutic oral daily doses of vitamin $B_{12}$ material may be as high as 50 micrograms or higher.

In order further to illustrate this invention but without being limited thereto, the following examples are given:

EXAMPLE I 110 milligrams of crystalline vitamin $B_{12}$, U.S.P. (cyanocobalamin) are dissolved in about 100 ml. of water and 52 grams of powdered magnesium trisilicate, U.S.P. of a particle size distribution of 0.4 to 16 microns are added to the solution obtained. The supernatant liquid is removed by centrifugation after stirring for one hour. About 20 ml. of water are added to the supernatant liquid followed by the further addition of 75 grams of said finely-divided magnesium trisilicate. The mixture formed is stirred for about one hour to permit adsorption of the cyanocobalamin on to the magnesium trisilicate and the mixture contrifuged to separate the supernatant liquid. To the latter are now added an additional 23 grams of magnesium trisilicate to complete the adsorption of any cyanocobalamin remaining and the magnesium trisilicate is separated by centrifugation. The separated portions of magnesium trisilicate are combined, mixed thoroughly and partly dried under vacuum for 24 hours. Approximately 174 grams of partly dried adsorbate are obtained.

EXAMPLE II 43.5 parts by weight of the above magnesium trisilicate adsorbate are weighed out and combined with 226 parts by weight of magnesium trisilicate as a diluent and lubricated with 5.5 parts by weight of magnesium stearate U.S.P., the whole then being thoroughly mixed. This mixture is then encapsulated in two-piece hard gelatin capsules each containing 275 mg. of the mixture, which is equivalent to about 25 micrograms of vitamin $B_{12}$.

The oral administration of the vitamin $B_{12}$ preparation above wherein the vitamin $B_{12}$ is in combination with magnesium trisilicate leads to much greater absorption of the vitamin $B_{12}$ than when the latter is administered alone. The relative absorption is determined by the well-known Schilling test wherein a person is treated orally with radioactive vitamin $B_{12}$ and this is followed two hours later by an intramuscular dose of unlabeled vitamin $B_{12}$. This dosage schedule results in a spill-over of excess vitamin $B_{12}$ into the urine which serves as a basis for measuring the amount of vitamin $B_{12}$ that has been absorbed into the system. Urine from the patient is collected for 24 hours and the vitamin $B_{12}$ content identified by counts of the radioactive material. Results are expressed in terms of percent by weight of the vitamin $B_{12}$ originally given. Employing hydroxycobalamin in making this test, the combination with magnesium trisilicate gave an absorption about three times greater than where the test is carried out with hydroxycobalamin alone.

The greater oral absorption of vitamin $B_{12}$ is also observed when absorption is measured in terms of serum levels in patients who are treated with 25 micrograms daily of cyanocobalamin alone and with the combination of cyanocobalamin adsorbed on magnesium trisilicate in the manner described above, e.g. as with said 25 mcg. capsules. Blood levels are determined at the beginning of the experiment and two months after administration. Values for the initial and final readings of serum concentrations of vitamin $B_{12}$ in millimicrograms are indicated as follows, group A being those to whom the vitamin $B_{12}$ is administered alone and group B those to whom it is administered along with magnesium trisilicate:

*Vitamin $B_{12}$ Serum Levels*

| Group A | | Group B | |
|---|---|---|---|
| 0 Months | 2 Months | 0 Months | 2 Months |
| 105 | 152 | 198 | 225 |
| 134 | 198 | 93 | 117 |
| 152 | 93 | 146 | 361 |
| 75 | 18 | 204 | 477 |
| 75 | 290 | 210 | 134 |
| 99 | 99 | 70 | 140 |
| 192 | 0 | 99 | 200 |
| 146 | 278 | 111 | 350 |
| 175 | 200 | 105 | 402 |
| 157 | 145 | | |
| | 147±31 | | 266±44.2 |

These serum levels of vitamin $B_{12}$ are given in $\mu\mu g./ml.$

It is understood that the foregoing detailed description is given merely by way of illustration and that many variations may be made therein without departing from the spirit of my invention.

Having described my invention, what I desire to secure by Letters Patent is:

1. The method of administering a vitamin $B_{12}$ material which comprises orally administering said vitamin $B_{12}$ material as an adsorbate on magnesium trisilicate as the carrier.

2. The method of administering cyanocobalamin which comprises orally administering said cyanocobalamin as an adsorbate on magnesium trisilicate as the carrier.

3. The method of administering hydroxycobalamin which comprises orally administering said hydroxycobalamin as an adsorbate on magnesium trisilicate as the carrier.

References Cited in the file of this patent

UNITED STATES PATENTS

| | | |
|---|---|---|
| 2,739,100 | McCormick et al. | Mar. 20, 1956 |
| 2,830,933 | Bouchard et al. | Apr. 15, 1958 |
| 2,846,352 | Bryant | Aug. 5, 1958 |